(12) United States Patent
Matsuura et al.

(10) Patent No.: US 10,654,349 B2
(45) Date of Patent: May 19, 2020

(54) SEALING STRUCTURE FOR AUTOMOBILE DOOR

(71) Applicants: NISHIKAWA RUBBER CO., LTD., Hiroshima-shi, Hiroshima-ken (JP); HONDA MOTOR CO., LTD., Tokyo (JP)

(72) Inventors: Toshifumi Matsuura, Hatsukaichi (JP); Akiyoshi Kubota, Hiroshima (JP); Toyohisa Amagai, Wako (JP)

(73) Assignees: NISHIKAWA RUBBER CO., LTD., Hiroshima-Shi, Hiroshima-Ken (JP); HONDA MOTOR CO., LTD, Tokyo (JP)

( * ) Notice: Subject to any disclaimer, the term of this patent is extended or adjusted under 35 U.S.C. 154(b) by 137 days.

(21) Appl. No.: 15/952,479

(22) Filed: Apr. 13, 2018

(65) Prior Publication Data

US 2018/0298679 A1 Oct. 18, 2018

(30) Foreign Application Priority Data

Apr. 15, 2017 (JP) ................. 2017-080995

(51) Int. Cl.
*B60J 10/86* (2016.01)
*B60J 10/76* (2016.01)
(Continued)

(52) U.S. Cl.
CPC ............... *B60J 10/86* (2016.02); *B60J 10/24* (2016.02); *B60J 10/265* (2016.02); *B60J 10/76* (2016.02); *E06B 7/2312* (2013.01)

(58) Field of Classification Search
CPC ....... E06B 7/2312; B60J 10/265; B60J 10/86; B60J 10/24; B60J 10/30; B60J 10/76
See application file for complete search history.

(56) References Cited

U.S. PATENT DOCUMENTS

| 7,325,859 | B1 * | 2/2008 | Brancaleone | .......... B60J 5/0402 296/146.9 |
| 2002/0108313 | A1 * | 8/2002 | Nozaki | .................. B60J 5/0402 49/441 |

(Continued)

FOREIGN PATENT DOCUMENTS

| JP | S62-3312 | 1/1987 |
| JP | 5402807 B2 | 1/2014 |

*Primary Examiner* — Justin B Rephann
(74) *Attorney, Agent, or Firm* — Robert P. Michal, Esq.; Carter, DeLuca & Farrell LLP (57) ABSTRACT

A sealing structure for an automobile door includes a roll sash with a projection on an inner-cabin side surface of an upper end periphery thereof, a press sash without a projection and joined to the roll sash, and a decorative molding which covers the sashes. An installation base member of a weather strip is configured to operably couple to an outer circumferential edge on an upper side of the door sash. The weather strip includes a hollow seal member and an outer seal lip. An outer-cabin side end of the installation base member and a rib-shaped protrusion which extends outwardly toward an exterior of an automobile are configured to clasp the projection. An upper part protrusion which extends outwardly toward the exterior of the automobile from an upper side relative to the rib-shaped protrusion is configured to make close contact with an upper part of the decorative molding.

4 Claims, 6 Drawing Sheets

(51) Int. Cl.
*B60J 10/24* (2016.01)
*E06B 7/23* (2006.01)
*B60J 10/265* (2016.01)

(56) References Cited

U.S. PATENT DOCUMENTS

| | | | |
|---|---|---|---|
| 2005/0178069 A1* | 8/2005 | Iwasa | B60J 10/22 49/498.1 |
| 2006/0042170 A1* | 3/2006 | Furuzawa | B60J 10/248 49/489.1 |
| 2006/0137255 A1* | 6/2006 | Nozaki | B60J 10/248 49/498.1 |
| 2007/0245635 A1* | 10/2007 | Deguchi | B60J 10/248 49/498.1 |
| 2011/0126473 A1* | 6/2011 | Prater | B60J 10/265 49/484.1 |
| 2011/0296763 A1* | 12/2011 | Lee | B60J 10/87 49/493.1 |
| 2012/0023831 A1* | 2/2012 | Matsumoto | B60J 10/24 49/489.1 |
| 2015/0210149 A1* | 7/2015 | Saiki | B60J 5/0404 296/152 |
| 2015/0283888 A1* | 10/2015 | Togashi | B60J 10/246 49/480.1 |
| 2016/0214468 A1* | 7/2016 | Endo | B60R 13/04 |
| 2018/0298678 A1* | 10/2018 | Amagai | B60J 10/78 |

* cited by examiner

SEALING STRUCTURE FOR AUTOMOBILE DOOR

CROSS REFERENCE TO RELATED APPLICATION

This application claims the benefit under 35 USC § 119 of JP Patent Application JP 2017-080995 filed Apr. 15, 2017, the entire disclosure of which is incorporated herein by reference.

BACKGROUND INFORMATION

The present invention relates to a sealing structure for an automobile door with a roll sash and a press sash joined to each other and a decorative molding provided on the sashes.

Figure 5:
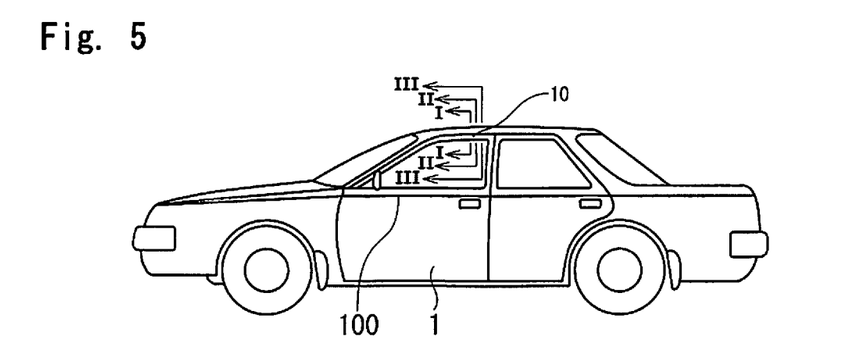
FIG. 5 is an external side view of an automobile.
Figure 6:
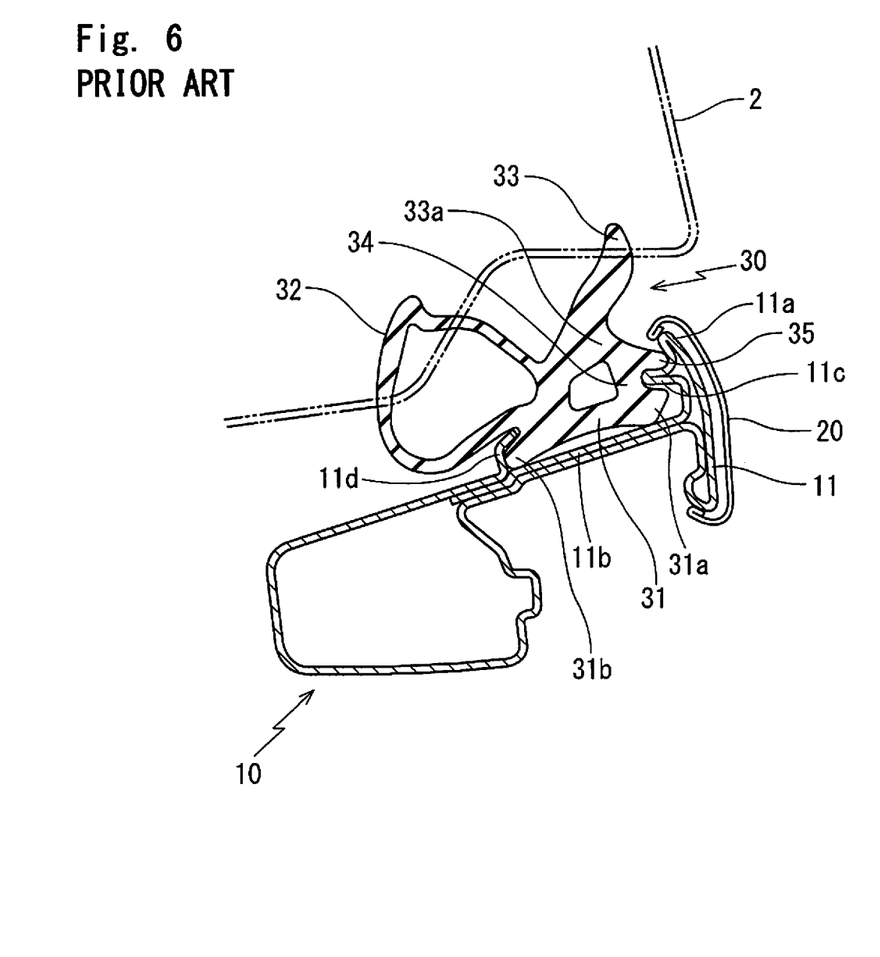
FIG. 6 is an enlarged sectional view of a sealing structure according to a prior art for an automobile door taken along line I-I of FIG. 5.
Figure 7:
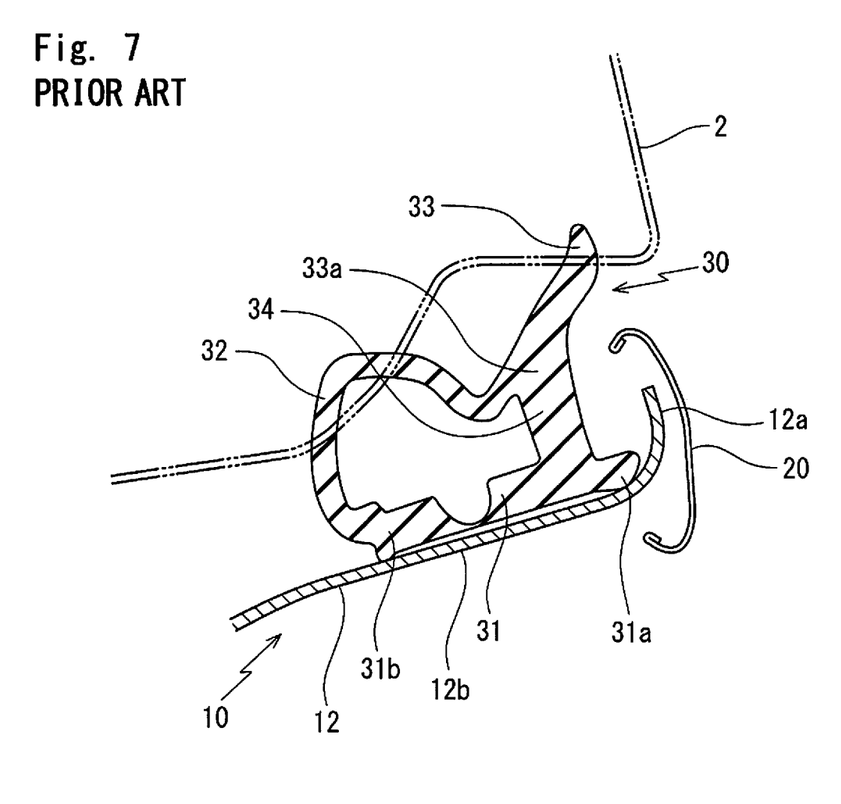
FIG. 7 is an enlarged sectional view of the sealing structure according to the prior art for the automobile door taken along line II-II of FIG. 5.

FIG. 5 to FIG. 7 show a conventional door 1, including a roll sash 11, a press sash 12, and a decorative molding 20. The roll sash 11 extends in a front and rear direction of the automobile. The press sash 12 extends in an upper and lower direction of the automobile and slightly extends in the front and rear direction of the automobile such that the press sash 12 is joined to the roll sash 11 by welding to form a corner of a door sash 10 on an upper periphery of an automobile door. The decorative molding 20 covers an upper end periphery 11a of the roll sash 11 and an upper end periphery 12a of the press sash 12 from an exterior of the automobile.

A door weather strip 30 is configured to operably couple to an outer circumferential edge on an upper side (outer circumferential edge on a roof side) of the door 1. A hollow seal member 32 and an outer seal lip 33 of the door weather strip 30 make elastic contact with a door opening edge of an automobile body 2 when the door 1 is in a closed position.

An installation base member 31 of the door weather strip 30 has a substantially plate-shape. As shown in FIG. 6, the installation base member 31 is arranged on a flat surface 11b of the roll sash 11. An outer-cabin side end 31a of the installation base member 31 is fit between a projection 11c on an inner-cabin side surface of the upper end periphery 11a of the roll sash 11 and the flat surface 11b. An inner-cabin side end 31b of the installation base member 31 is fit between an anchoring part 11d, which is vertically formed on an inner-cabin side of the flat surface 11b, and the flat surface 11b.

The door weather strip 30 also includes a rib-shaped protrusion 35 on an outer-cabin side between the installation base member 31 and the outer seal lip 33. The door weather strip 30 is configured to operably couple to the roll sash 11 by clasping the projection 11c of the roll sash 11 between the rib-shaped protrusion 35 and the outer-cabin side end 31a of the installation base member 31.

As shown in FIG. 7, the press sash 12 does not include a projection on an inner-cabin side surface of the upper end periphery 12a. Accordingly, the installation base member 31 of the door weather strip 30 is merely arranged on a flat surface 12b of the press sash 12, not fit on the press sash 12, and is unstable on the press sash 12.

This configuration undulates the outer seal lip 33, which is closer to an outside of the automobile than the hollow seal member 32 and makes elastic contact with the body 2, and degrades appearance when the door 1 is in the closed position. Also, this configuration degrades sealing performance and allows entrance of water toward an interior of the automobile.

The outer seal lip 33 may also undulate even in case the installation base member 31 of the door weather strip 30 is fixed on the flat surface 12b of the press sash 12 by double-sided tape or a clip not shown.

Prior arts in this connection include: Japanese Unexamined Utility Model Application Publication No. S62-3312 which discloses a door weather strip configured to operably couple to the roll sash; and Japanese Patent No. 5402807 which discloses the decorative molding provided on the door. But the prior arts have not disclosed the door weather strip configured to operably couple to the door with the roll sash 11 and the press sash 12 joined to each other and the decorative molding 20 provided on the sashes.

Therefore, an object of the present invention is to provide the sealing structure for the automobile door capable of preventing degradation in the sealing function as well as degradation in the appearance by keeping the outer seal lip from undulating.

SUMMARY

In order to achieve the above-mentioned object, according to one aspect of the invention, a sealing structure for an automobile door is provided, the sealing structure including:

a roll sash (11) which extends in a longitudinal direction, the roll sash (11) being roll-formed, the roll sash (11) including a projection (11c) on an inner-cabin side surface of an upper end periphery (11a) thereof;

a press sash (12) which extends upwardly from a door belt line (100) and turns in the longitudinal direction, the press sash (12) being press-molded, the press sash (12) including an upper end periphery (12a), the upper end periphery (12a) being free from a projection on an inner-cabin side surface thereof; the press sash (12) being joined to the roll sash (11) to form an upper part of a door sash (10);

a decorative molding (20) which extends in the longitudinal direction, the decorative molding (20) configured to cover the upper end periphery (11a) of the roll sash (11) and the upper end periphery (12a) of the press sash (12) from an exterior of the automobile; and a weather strip (30) which includes:

a hollow seal member (32) and an outer seal lip (33) which are configured to make elastic contact with a door opening edge of an automobile body (2) when a door (1) is in a closed position;

an installation base member (31) configured to operably couple to an outer circumferential edge on an upper side of the door sash (10), the installation base member (31) including an outer-cabin side end (31a);

a rib-shaped protrusion (35) which extends outwardly toward the exterior of the automobile from an upper side relative to the outer-cabin side end (31a), the outer-cabin side end (31a) and the rib-shaped protrusion (35) configured to clasp the projection (11c) of the roll sash (11) therebetween; and an upper part protrusion (50) which extends outwardly toward the exterior of the automobile from an upper side relative to the rib-shaped protrusion (35), the upper part protrusion (50) configured to make close contact with an upper part of the decorative molding (20).

In addition, according to an aspect of the present invention, the rib-shaped protrusion (35) and the upper part protrusion (50) are configured to clasp the upper part of the decorative molding (20) therebetween.

In addition, according to an aspect of the present invention, the rib-shaped protrusion (35) is configured to make elastic contact with the inner-cabin side surface of the upper end periphery (12a) of the press sash (12).

Symbols in parentheses show constituents or items corresponding to the drawings.

According to the present invention, the upper part protrusion of the door weather strip is configured to make close contact with the upper part of the decorative molding. Therefore, even on the press sash without the projection, this configuration stabilizes a lower part, base root in other words, of the outer seal lip.

This configuration also stabilizes the outer seal lip as a whole. Accordingly, this configuration prevents degradation in sealing function of the outer seal lip as well as degradation in appearance by keeping the outer seal lip from undulating when the door is in the closed position.

This configuration secures a stable water cut off function.

In addition, the upper part protrusion is configured to make close contact with the upper part of the decorative molding. This configuration allows the upper part protrusion to perform sealing function and prevents entrance of water across the upper part of the decorative molding.

In addition, the rib-shaped protrusion and the upper part protrusion clasp the upper part of the decorative molding therebetween. This configuration further stabilizes the outer seal lip.

The configuration "the rib-shaped protrusion and the upper part protrusion clasp the upper part of the decorative molding therebetween" may be arranged both on the roll sash and the press sash, only on the roll sash, or only on the press sash.

In addition, the rib-shaped protrusion makes elastic contact with the inner-cabin side surface of the upper end periphery of the press sash. This configuration further stabilizes the outer seal lip.

DETAILED DESCRIPTION

Referring to the drawings, a sealing structure according to an embodiment of the present invention for an automobile door will be described. When constituents or items correspond to those in prior arts, the same symbols are used.

Figure 1:
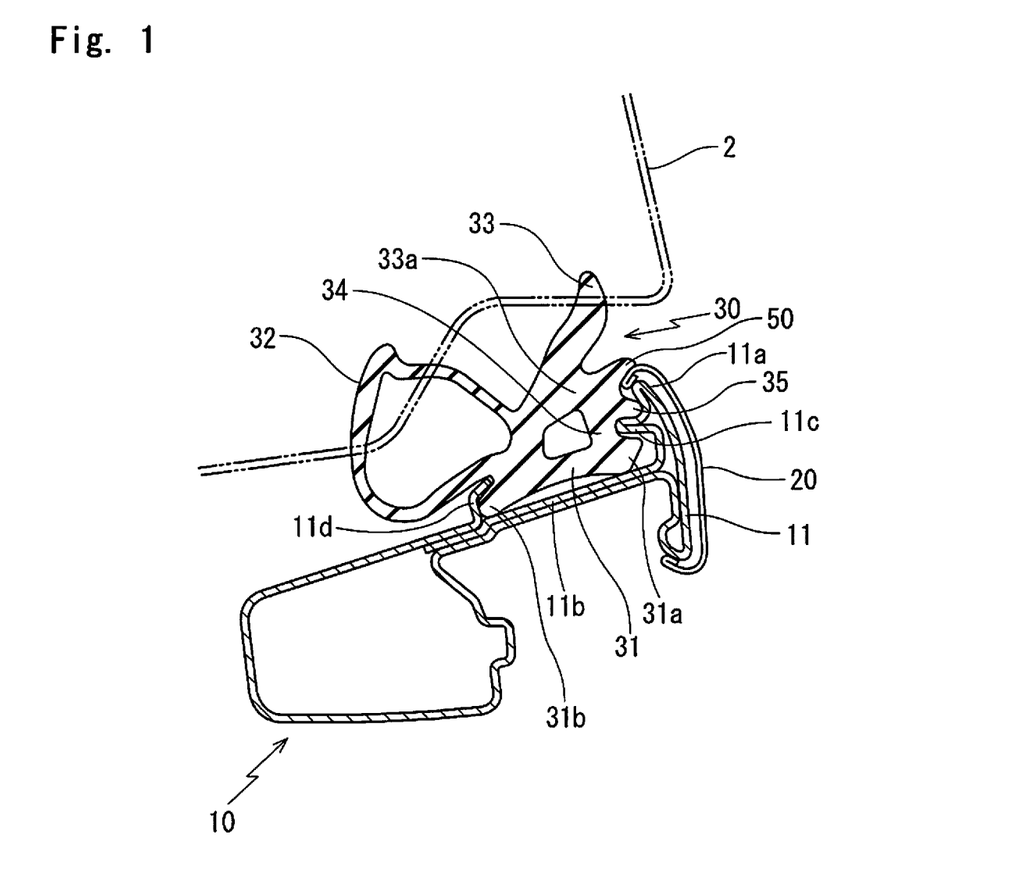
FIG. 1 is an enlarged sectional view of a sealing structure according to an embodiment of the present invention for an automobile door taken along line I-I of FIG. 5.
Figure 2:
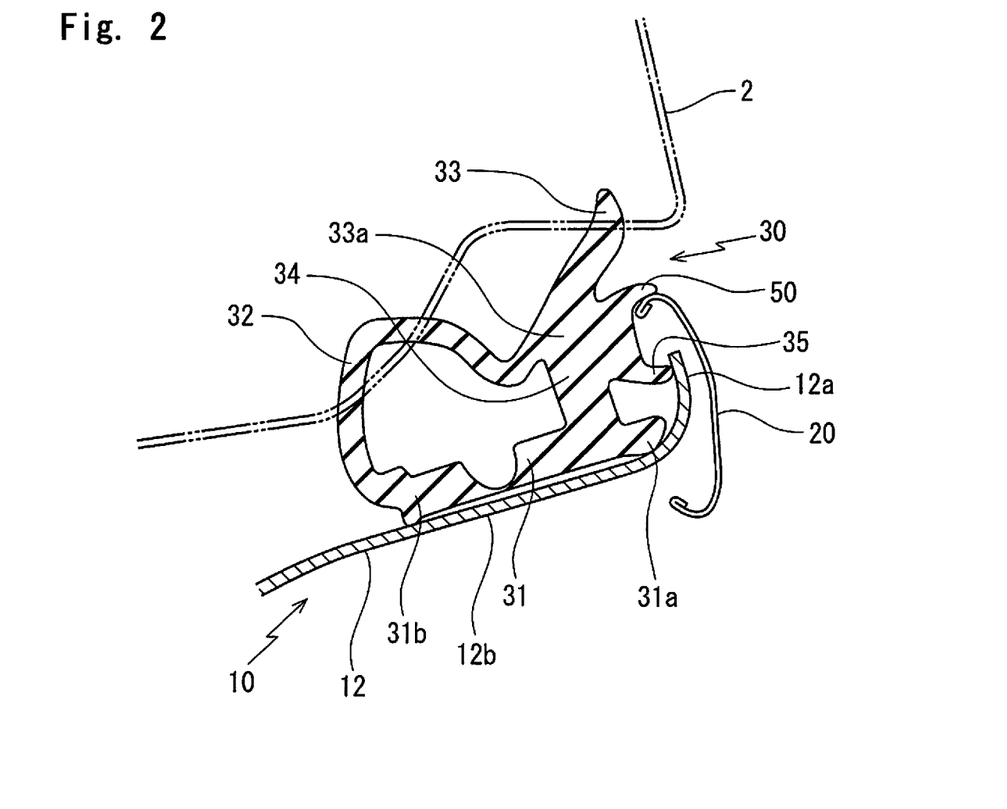
FIG. 2 is an enlarged sectional view of the sealing structure according to the embodiment of the present invention for the automobile door taken along line II-II of FIG. 5.

A door 1 includes a roll sash 11 and a press sash 12. The roll sash 11 extends in a longitudinal direction (front and rear direction of an automobile when the door 1 is in a closed position) and is roll-formed. The press sash 12 is press-molded to extend upwardly from a door belt line 100 and to turn slightly in the longitudinal direction in the same manner as the roll sash 11. The press sash 12 is joined to the roll sash 11 by welding to form an upper part of a door sash 10. As shown in FIG. 1, the roll sash 11 includes a projection 11c on an inner-cabin side surface of an upper end periphery 11a thereof. The projection 11c extends inwardly toward an interior of the automobile. As shown in FIG. 2, press sash 12 is free from a projection, which extends inwardly toward the interior of the automobile, on an inner-cabin side surface of an upper end periphery 12a.

The upper end periphery 11a of the roll sash 11 is on an outer-cabin side of a flat surface 11b. An anchoring part 11d is vertically formed on an inner-cabin side of the flat surface 11b. The flat surface 11b extends in the longitudinal direction and is wide in an inner-cabin and an outer-cabin direction.

The upper end periphery 12a of the press sash 12 is vertically formed on an outer-cabin side of a flat surface 12b. The flat surface 12b extends in the longitudinal direction and is wide in an inner-cabin and an outer-cabin direction.

FIG. 1 is an enlarged sectional view taken along line I-I of FIG. 5 and FIG. 2 is an enlarged sectional view taken along line II-II of FIG. 5. The press sash 12 is joined to the roll sash 11 on a position between the line I-I and the line II-II of FIG. 5.

A decorative molding 20 extends in the longitudinal direction and is configured to cover the upper end periphery 11a of the roll sash 11 and the upper end periphery 12a of the press sash 12 from an exterior of the automobile.

Examples of the decorative molding 20 include "optical moldings". An outer-cabin side surface of the optical molding is colored silver and is mirror-finished to give a sense of luxury to the automobile.

A weather strip 30 configured to operably couple to the automobile door includes: an installation base member 31, configured to operably couple to an outer circumferential edge on an upper side (outer circumferential edge on a roof side) of the door sash 10; a hollow seal member 32, which is integrally molded with the installation base member 31 and functions as a main seal; and an outer seal lip 33, which is integrally molded with the installation base member 31 and functions as a sub seal. The door weather strip 30 includes an extrusion-molded part that is connected by die molding on a corner. On the press sash 12 as well as where the press sash 12 is joined to the roll sash 11, a die-molded part of the door weather strip 30 is arranged.

The installation base member 31 substantially has a plate shape. As shown in FIG. 1, the installation base member 31 is arranged on the flat surface 11b of the roll sash 11. An outer-cabin side end 31a of the installation base member 31 is fit between the projection 11c on the inner-cabin side surface of the upper end periphery 11a of the roll sash 11 and the flat surface 11b. An inner-cabin side end 31b of the installation base member 31 is fit between an anchoring part 11d, which is vertically formed on an inner-cabin side of the flat surface 11b, and the flat surface 11b.

As shown in FIG. 2, the installation base member 31 is arranged on a flat surface 12b of the press sash 12. The installation base member 31 of the door weather strip 30 may be fixed on the flat surface 12b of the press sash 12 by double-sided tape or a clip.

The hollow seal member 32 and the outer seal lip 33 are adjacent to each other. The hollow seal member 32 is integrally molded with an inner-cabin side of the installation base member 31 and the outer seal lip 33 is integrally molded with an outer-cabin side of the installation base member 31. A top end of the outer seal lip 33 substantially has a tongue-shaped cross section and extends in an outer circumferential direction of the door 1 and outwardly toward the exterior of the automobile.

A prop 34 is vertically provided on the outer-cabin side of the installation base member 31. A base root 33a of the outer seal lip 33 connects with an upper part on an inner-cabin side of the prop 34. A rib-shaped protrusion 35 extends outwardly toward the exterior of the automobile from a substantial center on an outer-cabin side of the prop 34.

An upper part protrusion 50 extends outwardly toward the exterior of the automobile from an upper part on the outer-cabin side of the prop 34.

The rib-shaped protrusion 35 extends outwardly toward the exterior of the automobile from an upper side relative to an outer-cabin side end 31a of the installation base member 31. As shown in FIG. 1, on the roll sash 11, the outer-cabin side end 31a of the installation base member 31 and the rib-shaped protrusion 35 are configured to clasp the projection 11c of the roll sash 11 therebetween.

The upper part protrusion 50 extends outwardly toward the exterior of the automobile from an upper side relative to the rib-shaped protrusion 35. The upper part protrusion 50 is configured to make close contact with an upper part of the decorative molding 20.

On the roll sash 11, as shown in FIG. 1, the rib-shaped protrusion 35 and the upper part protrusion 50 are configured to clasp the upper part of the decorative molding 20 therebetween. Alternatively, the upper part protrusion 50 may be configured to merely make close contact with the upper part of the decorative molding 20 on the roll sash 11 without clasping the upper part of the decorative molding 20 with the rib-shaped protrusion 35.

On the press sash 12, as shown in FIG. 2, the rib-shaped protrusion 35 extends to an inner-cabin side surface of the upper end periphery 12a of the press sash 12 and makes elastic contact with the inner-cabin side surface.

On the press sash 12, the upper part protrusion 50 extends outwardly toward the exterior of the automobile from the upper side relative to the rib-shaped protrusion 35. The upper part protrusion 50 is configured to make close contact with the upper part of the decorative molding 20.

As evident from above, the upper part protrusion 50 is configured to make close contact continuously with the upper part of the decorative molding 20, which is provided on an upper part of the door sash 10.

Figure 3:
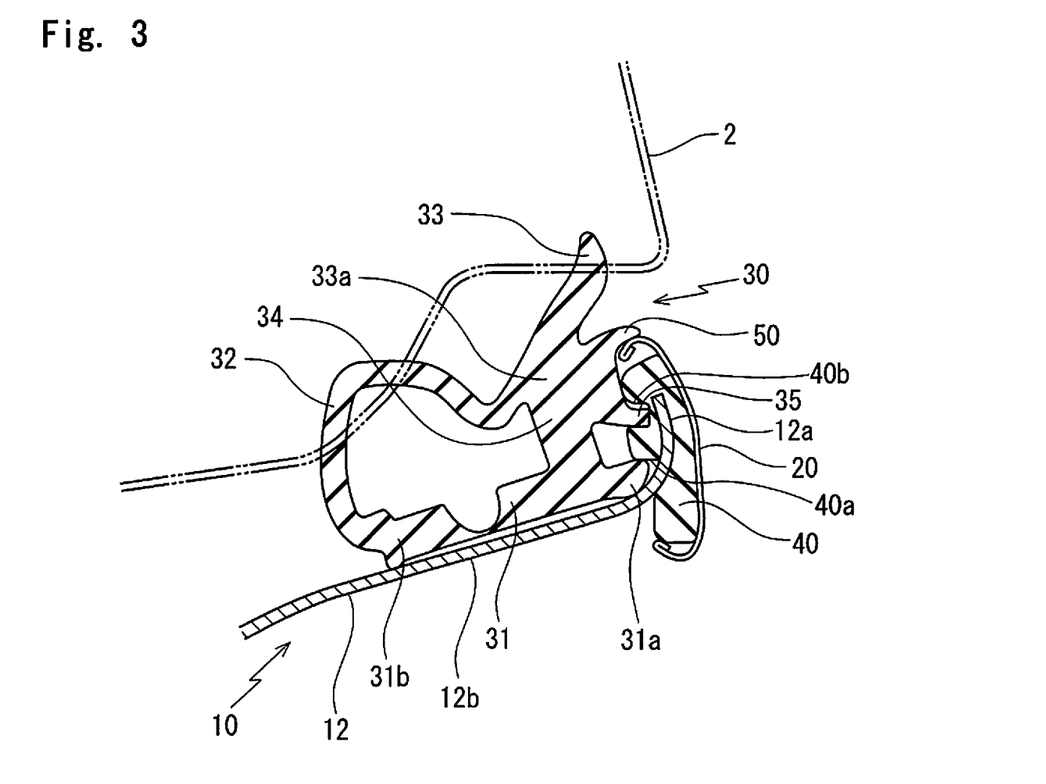
FIG. 3 is an enlarged sectional view of the sealing structure according to the embodiment of the present invention for the automobile door taken along line III-III of FIG. 5.

On an end part of the press sash 12 and a rear side of the door 1, as shown in FIG. 3, an end cap 40 covers up a gap between the decorative molding 20 and the upper end periphery 12a of the press sash 12. The outer-cabin side end 31a of the installation base member 31 and the rib-shaped protrusion 35 fit with concave shaped openings 40a, 40b of the end cap 40, respectively.

In the sealing structure according to the embodiment of the present invention for the automobile door, the upper part protrusion 50 of the door weather strip 30 is configured to make close contact with the upper part of the decorative molding 20. Therefore, even on the press sash 12 without the projection, this configuration stabilizes the base root 33a on a lower part of the outer seal lip 33.

This configuration also stabilizes the outer seal lip 33 as a whole. Accordingly, this configuration prevents degradation in sealing function of the outer seal lip 33 as well as degradation in appearance by keeping the outer seal lip 33 from undulating when the door 1 is in the closed position.

In addition, the upper part protrusion 50 is configured to make close contact with the upper part of the decorative molding 20. This configuration prevents entrance of water across the upper part of the decorative molding 20. Also, this configuration is improved in the sealing function compared with the prior arts in FIG. 6 and FIG. 7.

In addition, the sealing structure according to the embodiment of the present invention for the automobile door allows the upper part protrusion 50 to perform the sealing structure as far as the decorative molding 20 is provided. In case the decorative molding 20 is provided along the whole upper end periphery of the door 1, the upper part protrusion 50 performs the sealing structure along the whole upper end periphery of the door 1. The upper part protrusion 50 provides uniform sealing conditions even on uneven bases caused by vestige of welding in case the sashes are joined by welding.

In addition, the rib-shaped protrusion 35 and the upper part protrusion 50 clasp the upper part of the decorative molding 20 therebetween. This configuration further stabilizes the outer seal lip 33.

Figure 4:
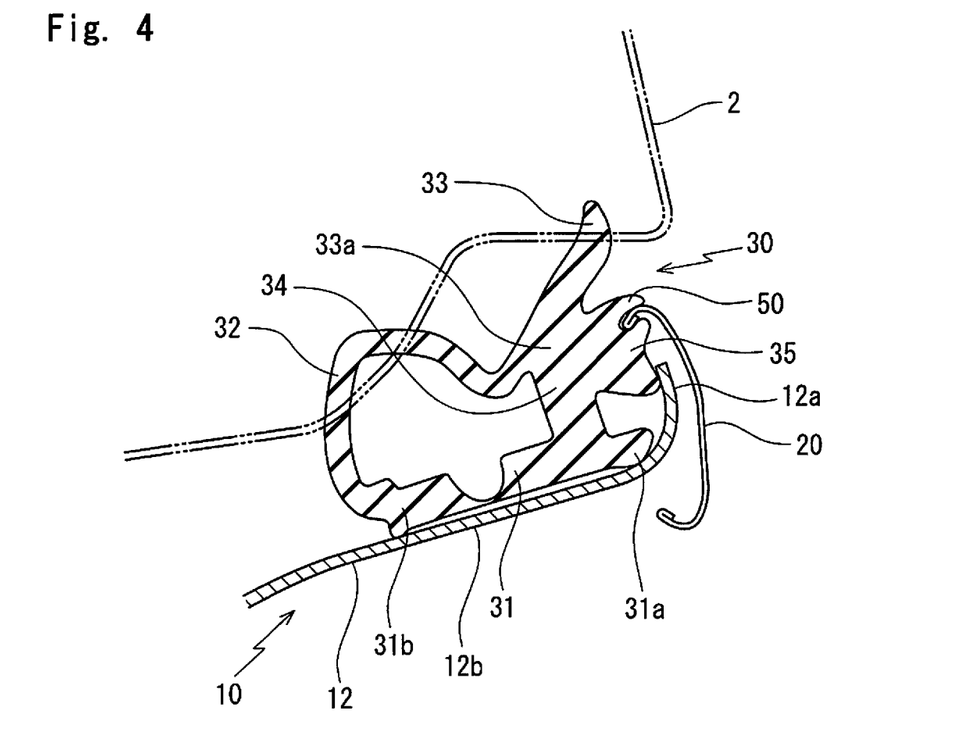
FIG. 4 is an enlarged sectional view of another sealing structure according to the embodiment of the present invention for the automobile door taken along line II-II of FIG. 5.

The configuration "the rib-shaped protrusion 35 and the upper part protrusion 50 clasp the upper part of the decorative molding 20 therebetween" may be arranged only on the roll sash 11 as shown in FIG. 1 and FIG. 2, on the press sash 12 as shown in FIG. 4 as well as the roll sash 11, or only on the press sash 12.

While in this embodiment the door 1 is a front door, the present invention is also applicable to a rear door.

We claim:

1. A sealing structure for an automobile door, the automobile door comprising:
    a roll sash which extends in a longitudinal direction, the roll sash being roll-formed, the roll sash including a projection on an inner-cabin side surface of an upper end periphery thereof;
    a press sash which extends upwardly from a door belt line and turns in the longitudinal direction, the press sash being press-molded, the press sash including an upper end periphery, the upper end periphery being free from a projection on an inner-cabin side surface thereof;
    the press sash being joined to the roll sash to form an upper part of a door sash;
    a decorative molding which extends in the longitudinal direction, the decorative molding configured to cover the upper end periphery of the roll sash and the upper end periphery of the press sash from an exterior of the automobile; and
    a weather strip which includes:
        a hollow seal member and an outer seal lip which are configured to make elastic contact with a door opening edge of an automobile body when the automobile door is in a closed position;
        an installation base member configured to operably couple to an outer circumferential edge on an upper side of the door sash, the installation base member including an outer-cabin side end;
        a rib-shaped protrusion which extends outwardly toward the exterior of the automobile relative to the outer-cabin side end, the outer-cabin side end and the rib-shaped protrusion configured to clasp the projection of the roll sash therebetween; and
        an upper part protrusion which extends outwardly toward the exterior of the automobile relative to the rib-shaped protrusion, the upper part protrusion configured to make close contact with an upper part of the decorative molding.

2. The sealing structure for the automobile door as claimed in claim 1, wherein the rib-shaped protrusion and the upper part protrusion are configured to clasp the upper part of the decorative molding therebetween.

3. The sealing structure for the automobile door as claimed in claim 1, wherein the rib-shaped protrusion is configured to make elastic contact with the inner-cabin side surface of the upper end periphery of the press sash.

4. The sealing structure for the automobile door as claimed in claim 2, wherein the rib-shaped protrusion is configured to make elastic contact with the inner-cabin side surface of the upper end periphery of the press sash.

* * * * *